Dec. 23, 1958  C. D. FISHER ET AL  2,865,521
BULK MATERIAL TRUCK
Filed June 6, 1957  2 Sheets-Sheet 1

INVENTOR
CHESTER DONALD FISHER
GREER MARECHAL, JR
BY
Greer Marechal, Jr.
ATTORNEY Dec. 23, 1958 C. D. FISHER ET AL 2,865,521
BULK MATERIAL TRUCK
Filed June 6, 1957
2 Sheets-Sheet 2

INVENTOR
CHESTER DONALD FISHER
GREER MARÉCHAL, JR.
BY
Greer Maréchal, Jr
ATTORNEY

United States Patent Office 2,865,521
Patented Dec. 23, 1958

2,865,521

BULK MATERIAL TRUCK

Chester Donald Fisher, Muncy, Pa., and Greer Marechal, Jr., New York, N. Y., assignors to Sprout, Waldron & Company, Inc., Muncy, Pa., a corporation of Pennsylvania Application June 6, 1957, Serial No. 664,108

1 Claim. (Cl. 214—83.28)

This invention relates to a pneumatically self-loading and/or self-unloading truck for transporting loose bulk material and, more particularly, to such a truck having a convertible separating device for use, during loading, as a collecting tank for the bulk material and, during unloading, as a dust inhibitor or separator.

The present invention is particularly adapted to the type of pneumatic self-loading and/or self-unloading bulk truck disclosed in the copending application of Chester Donald Fisher, Serial No. 454,374 filed September 7, 1954, now Patent No. 2,798,628. As disclosed therein, a bulk truck is provided for transporting, collecting, and delivering bulk feed, grain, and like materials. In self-loading operations, the bulk material is sucked into a collecting tank having a tangential inlet at the top somewhat like a cyclone separator to separate the bulk material from the air stream in which it is entrained. The bulk material then drops down through the bottom of the collecting tank into a rotary airlock having a paddle wheel feeder from which it is blown up into the truck body proper. In self-unloading operations, material from the truck body is entrained in an airstream and pneumatically conveyed through a flexible hose to a bin or other receptacle to which delivery is being made.

In the use of the structure disclosed in the aforementioned application, it has been found that the delivery of certain bulk materials to an open bin is attended by a substantial amount of dust produced as a result of the pneumatic conveying or entraining the material in a stream of air. According to this invention, then, a dust collector or separator is provided for such unloading operations to prevent or inhibit undesirable production of dust upon the delivery of the material, and means are provided for movably positioning the dust collector or separator remote from the truck and adjacent the bin or other receptacle into which the material is being delivered as well as, in a preferred embodiment, providing an arrangement whereby the dust collector or separator for unloading operations is convertible into the aforementioned collecting tank during loading operations.

One object of this invention is to provide in a bulk material truck of the character described, a convertible device for use selectively as either a preliminary collecting tank or a dust separator and with means for mounting the device on the truck in position for use as a collecting tank during self-loading operations or, selectively, suspended at a position remote from the truck over a bin or receptacle during unloading operations.

A further object of this invention is to provide, in a device of the character described, extensible mounting means for selectively positioning a collecting tank either adjacent the bulk material truck or extended remotely therefrom over a bin or receptacle into which material is being pneumatically conveyed from the truck.

Other objects and advantages of this invention will be apparent from the following description, the accompanying drawings, and the appended claim.

Figure 4:
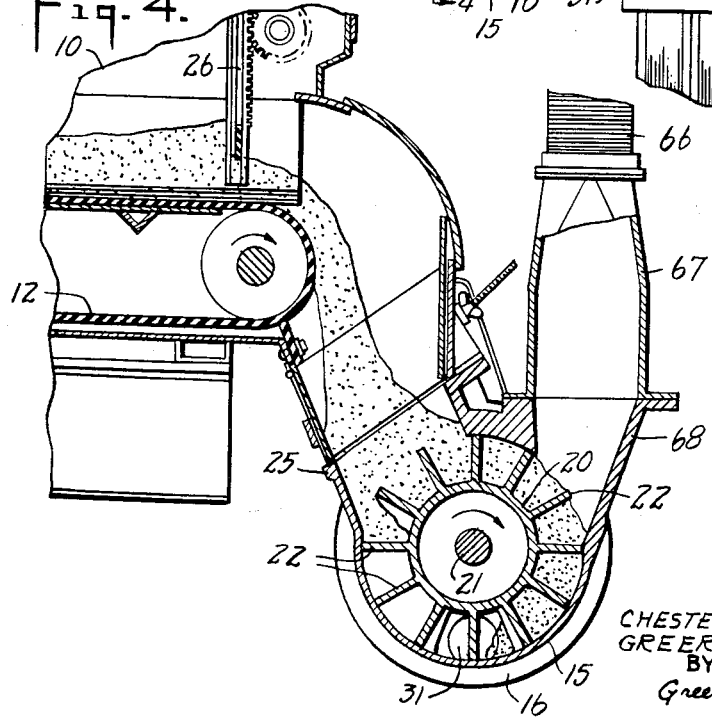
Fig. 4 is a partial vertical section along the line 4—4 of Fig. 2.

Referring to the drawings in which like reference characters refer to like parts throughout the several views thereof, a bulk material truck embodying this invention is shown as comprising generally a bin 10 for transporting bulk material with an inwardly tapering lower portion 11. Inside bin 10 at the bottom thereof there is an endless belt conveyor 12 driven from the power take-off on the truck engine (not shown) which, during unloading operations, conveys bulk material from bin 10 toward the rear of the truck and feeds it into an airlock or feeder arrangement indicated particularly in Fig. 4 as having a generally cylindrical housing 15 provided with a number of reinforcing ribs 16. Rotating within housing 15 is a paddle wheel arrangement 20 mounted on a shaft 21 driven for rotation from the truck engine and carrying a plurality of outwardly extending paddles 22. Housing 15 also includes a hopper-like material inlet 25 into which material from the truck is conveyed by conveyor 12, with the quantity of material preferably being regulated by a vertically movable gate 26 at the rear end of conveyor 12. The airlock housing 15 also has an air inlet 30 at one end thereof and a material outlet 31 at the opposite end thereof axially aligned with inlet 30. A stream of air under pressure from a blower (not shown) is introduced into inlet 30, and bulk material in the pocket defined by two adjacent blades 22 of paddle wheel 20 is entrained in the stream of air and ejected through outlet 31 as a particular pocket between two blades 22 becomes aligned with air inlet 30 and outlet 31 during rotation of paddle wheel 20.

Figure 1:
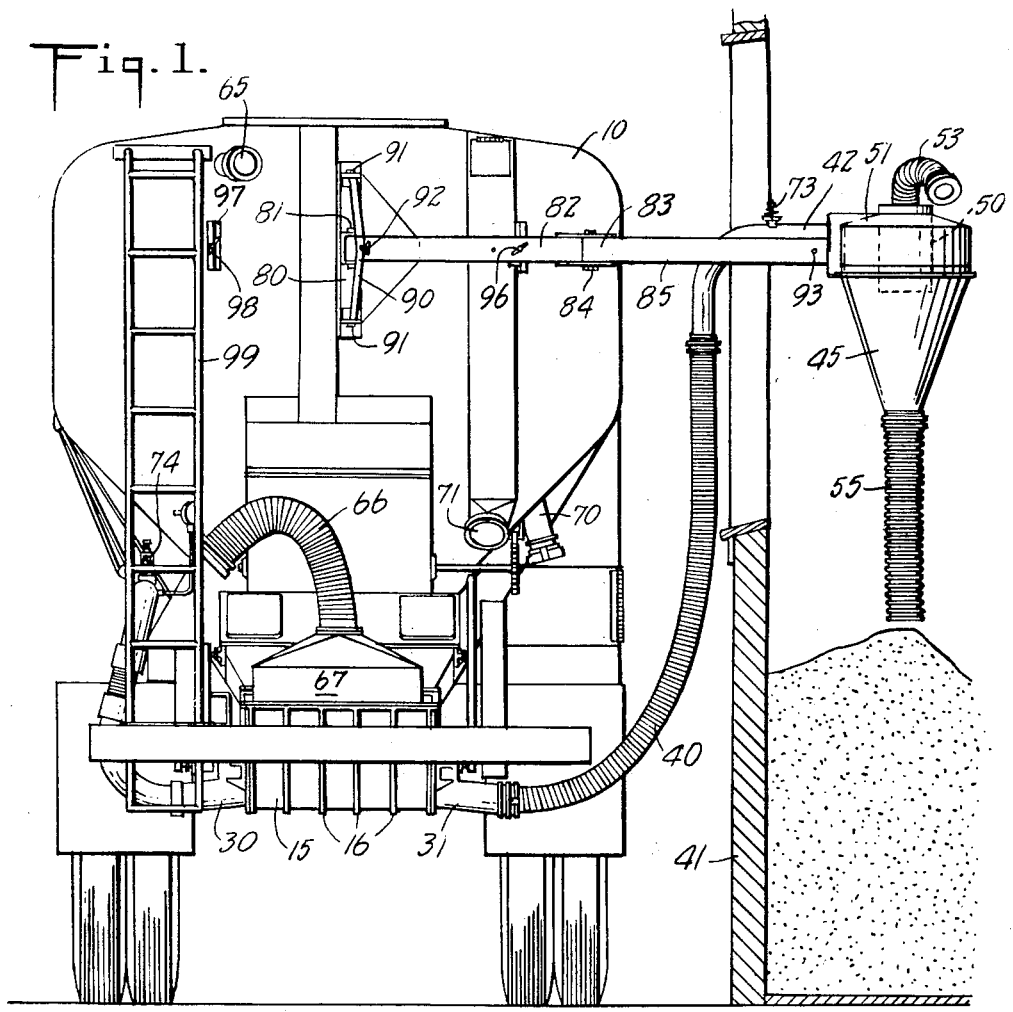
Fig. 1 is a rear view of a bulk material truck embodying this invention shown in unloading position with respect to a bin or receptacle for the material being unloaded from the truck.

A length of flexible tubing 40 is coupled to outlet 31 and arranged to carry the bulk material being blown out of the pockets between the blades 22 as desired—for example, into a storage bin 41 to which a delivery of bulk material is being made. With certain bulk materials, such pneumatic delivery is attended by an undesirable amount of dust. To alleviate this condition, then, a dust separating or collecting device is provided, as shown in Fig. 1, for the separation of bulk material being blown through flexible tube 40 from the stream of air in which it is entrained prior to entering bin 41. Thus, bulk material entrained in the stream of air passes through flexible tube 40, through an elbow 42, and into a conical container 45. The inlet 46 where elbow 42 enters container 45 is positioned tangentially adjacent the top of container 45 so that a whirling motion is imparted to the air entrained material. A circular sleeve 50 is affixed around the central portion of the top 51 of container 45 and depending for some distance therebelow. An air outlet opening 52 is provided in the top 51 inside sleeve 50 and it is preferably provided with a short length of flexible tubing 53.

As will be apparent from the foregoing, bulk material entrained in a stream of air enters the container tangentially and, in known manner, the bulk material drops down through container 45 while the entraining air is ejected through tube 52 at the top of the container. The bottom of container 45 is open so material introduced into the container drops out the bottom thereof into bin 41. As indicated in Fig. 1 a cloth sleeve 55 is preferably provided at the bottom of container 45 as further dust preventing means. Accordingly, with such separating mechanism, the bulk material being unloaded from the truck is separated from its entraining airstream in container 45 and delivered into bin 41 without the necessity of directing the airstream into bin 41 or into the mass of bulk material already therein.

Figure 2:
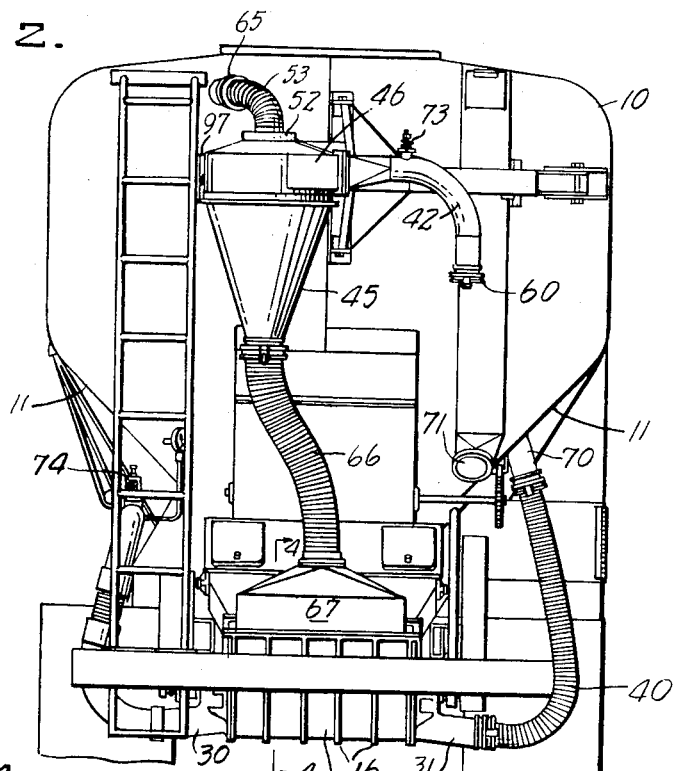
Fig. 2 is a rear view similar to Fig. 1 showing the convertible apparatus embodying this invention in self-loading position.

In loading operations, the apparatus is arranged as indicated in Fig. 2. An additional length of flexible tubing (not shown) is affixed to the coupling 69 on elbow 42, and the other end of such tubing is introduced into a bin or other source of bulk material which it is desired to load pneumatically or suck into the truck. Container 45 is positioned as shown in Fig. 2 rather than as shown in Fig. 1, and flexible tube 53 at the top of container 45 is coupled to a suction conduit 65 which communicates with the inlet or suction side of the aforementioned blower. A length of flexible tubing 66 connects the bottom of container 45 with a housing 67 in flow communication with a material inlet 68 into airlock housing 15.

With the device in operation, then, the blower is started thus evacuating container 45 and sucking loose bulk material thereinto through elbow 42 and inlet 46 from a source of material outside the truck. The material sucked into container 45 is separated therein from the airstream in suction conduit 65 and drops out the bottom of container 45 through flexible tube 66 and housing 67 into the paddle wheel feeder in much the same way as the material from inside the truck drops into the feeder during unloading (see Fig. 4). The material in the pockets between paddles 22, then, is blown therefrom by air entering the feeder through inlet 30, and the air entrained material is ejected from the feeder through outlet 31 and flexible tube 40. During self-loading operations the flexible tube 40 is connected to inlet 70 so that the material is blown from the feeder into the bin 10 on the truck. A vent or air outlet 71 is provided for the escape of entraining air from the truck bin. Also, pressure relief valves 73 and 74 are preferably provided as indicated in the pneumatic air flow system.

A preferred extensible mounting for the conical container 45 is indicated in the drawings as comprising a main bracket 80 affixed to the rear wall of the truck body or bin 10. Pivotally mounted on bracket 80 at 81 is an arm 82 having at the outer end thereof a bracket 83. Pivotally mounted at 84 in bracket 83 is a second arm 85 to the outer end of which is affixed conical container 45 as by the bracket 86.

Figure 3:
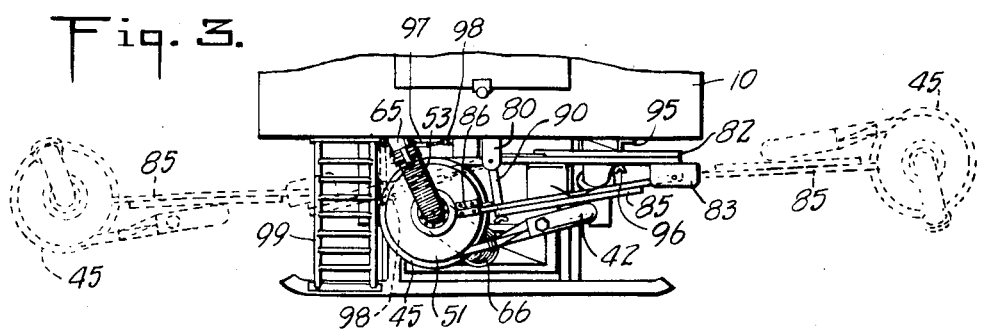
Fig. 3 is a top plan fragmentary view of the truck of Figs. 1 and 2 showing, in full line, the convertible device according to this invention in the position of Fig. 2 and, in dotted line, the convertible device extended to two remote positions on either side of the truck as in Fig. 1.

By virtue of the two pivots 81 and 84, arms 82 and 85 may be extended from the truck as in Fig. 1, folded upon themselves to bring conical container 45 adjacent the truck body as in Fig. 2 and the solid line position of Fig. 3, or extended to the opposite side of the truck as in the left-hand dotted line of Fig. 3. In this way, conical container 45 functions selectively as the collecting tank for self-loading operations as in Fig. 2, or as a dust collector extended in unloading to either side of the truck as in the two dotted line positions of Fig. 3.

A rearwardly extending bracket 90 is also pivotally mounted at 91 on bracket 80 and carries a bolt and wingnut 92 or other readily releasable fastening which engages a hole 93 adjacent the outer end of arm 85 to maintain arm 85 folded upon itself when container 45 is in the self-loading or carrying position indicated in Fig. 2 and the solid line position of Fig. 3. Also, when in this position, a bracket 95 having a wingnut or similar readily releasable fastener 96 engages arm 82, as indicated in Fig. 3 to maintain it extended in the proper direction and to give additional support to the arms. Also, as noted in Fig. 1, this bracket 95 and wingnut 96 engage arm 82 when the structure is extended from the truck as in Fig. 1 to the right. A similar bracket 97 and wingnut fastener 98 is provided on the opposite side of the truck similarly to engage arm 82 when the structure is extended to the left of the truck as in the left-hand dotted line position of Fig. 3, the height of bracket 80 and its appendant structure being arranged on the rear of the truck with regard to the positioning and inclination of ladder 99 so that the structure is high enough to pass ladder 99 when extended to the left in Fig. 3 and at a point where ladder 99 is inclined sufficiently close to the rear of bin 10 to avoid interference with the arms 82 and 85.

Accordingly, a structure is provided for mounting conical collecting tank or separator 45 on a bulk feed truck embodying this invention so that the single separator or container may be used selectively as a collecting tank during self-loading operations and/or, still mounted integrally with the truck, may be selectively extended remotely from the truck to either side to provide for dust separation and avoidance during unloading and delivery of bulk material from the truck.

While the form of apparatus herein described constitutes a preferred embodiment of the invention, it is to be understood that the invention is not limited to this precise form of apparatus, and that changes may be made therein without departing from the scope of the invention which is defined in the appended claim.

What is claimed is:

In a pneumatic bulk material truck of the character described having an airlock and means for entraining in a conveying stream of air bulk material introduced into said airlock for pneumatically conveying said entrained material selectively either into said truck during loading or to a point remote from said truck during unloading, the combination which comprises a separating and collecting tank having a material outlet at the bottom thereof, detachable conduit means for interconnecting said material outlet with said airlock means, a material inlet adjacent the top of said collecting tank, means for evacuating said collecting tank through said air outlet thereof during loading operations effecting sucking in of material from outside said truck entraining in a stream of air through said material inlet and separation of said material from said entraining air in said collecting tank, extensible means for mounting said collecting tank on said truck for movement from a position adjacent said airlock and evacuating means during loading to a plurality of extended positions remote from said truck during unloading, and detachable conduit means for conducting material from said truck entrained in a stream of air into said tangential inlet of said collecting tank during unloading.

References Cited in the file of this patent

UNITED STATES PATENTS

| 1,887,831 | Willett et al. | Nov. 15, 1932 |
| 2,063,652 | Woodruff | Dec. 8, 1936 |
| 2,703,733 | Stueven | Mar. 8, 1955 |
| 2,798,628 | Fisher | July 9, 1957 |

FOREIGN PATENTS

| 1,119,761 | France | Apr. 9, 1956 |